United States Patent [19]
Tanaka et al.

[11] Patent Number: 4,802,047
[45] Date of Patent: Jan. 31, 1989

[54] DISC CARTRIDGE

[75] Inventors: Kimio Tanaka; Haruo Shiba, both of Nagano, Japan

[73] Assignee: TDK Corporation, Japan

[21] Appl. No.: 39,675

[22] Filed: Apr. 16, 1987

[30] Foreign Application Priority Data

Apr. 17, 1986 [JP] Japan ............................ 61-56796[U]

[51] Int. Cl.⁴ ...................... G11B 23/03; G11B 19/00; G11B 5/82
[52] U.S. Cl. .................................... 360/133; 360/135; 369/291
[58] Field of Search .................... 360/133, 97, 98, 135; 206/444; 369/291, 77.2, 258, 270

[56] References Cited

U.S. PATENT DOCUMENTS

| | | | |
|---|---|---|---|
| 3,416,150 | 12/1968 | Lindberg | 360/133 |
| 3,529,301 | 9/1970 | Hiruta | 360/133 |
| 4,399,480 | 8/1983 | Edwards | 360/133 |
| 4,688,127 | 8/1987 | Oishi et al. | 360/133 |
| 4,692,831 | 9/1987 | Suzuki | 360/133 |

FOREIGN PATENT DOCUMENTS

| | | | |
|---|---|---|---|
| 137965 | 4/1985 | European Pat. Off. | 360/133 |
| 2537320 | 6/1984 | France | 369/291 |
| 58-212665 | 12/1983 | Japan | 360/133 |
| 60-50680 | 3/1985 | Japan | 360/133 |

Primary Examiner—John H. Wolff
Assistant Examiner—Matthew J. Bussan
Attorney, Agent, or Firm—Steinberg & Raskin

[57] ABSTRACT

A disc cartridge capable of effectively preventing a shutter from being opened even when any unexpected shock is suddenly applied to the disc cartridge during non-use of the disc cartridge. The disc cartridge includes a connection mechanism for operatively connecting to disc receivers, actuators for releasably locking the shutter. The connection mechanism is constituted by a guide groove provided in the actuator and formed into a substantially sideways U-shape, and a guide pin provided on the disc receiver and movably fitter within the guide groove. The guide pin is spaced from two surfaces of the guide groove opposite to the guide pin, in the actuating direction of the actuator. Also, the disc cartridge includes a substantially V-shaped spring for constantly positioning the guide pin within the guide groove and forcing the disc receiver to return to its original position to keep the guide pin apart from the opposite surfaces of the guide groove. Thus, even when the disc receiver is moved due to any shock applied to the disc cartridge during non-use, it is effectively prevented from abutting against the actuator, resulting in failure to actuate the actuator and preventing actuation of the shutter during non-use.

14 Claims, 5 Drawing Sheets

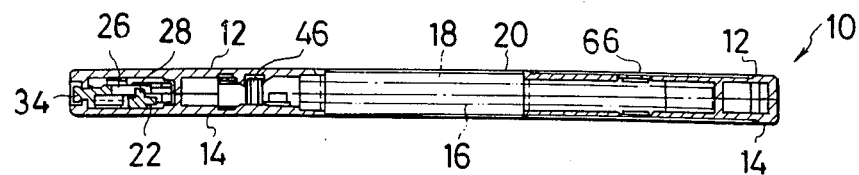
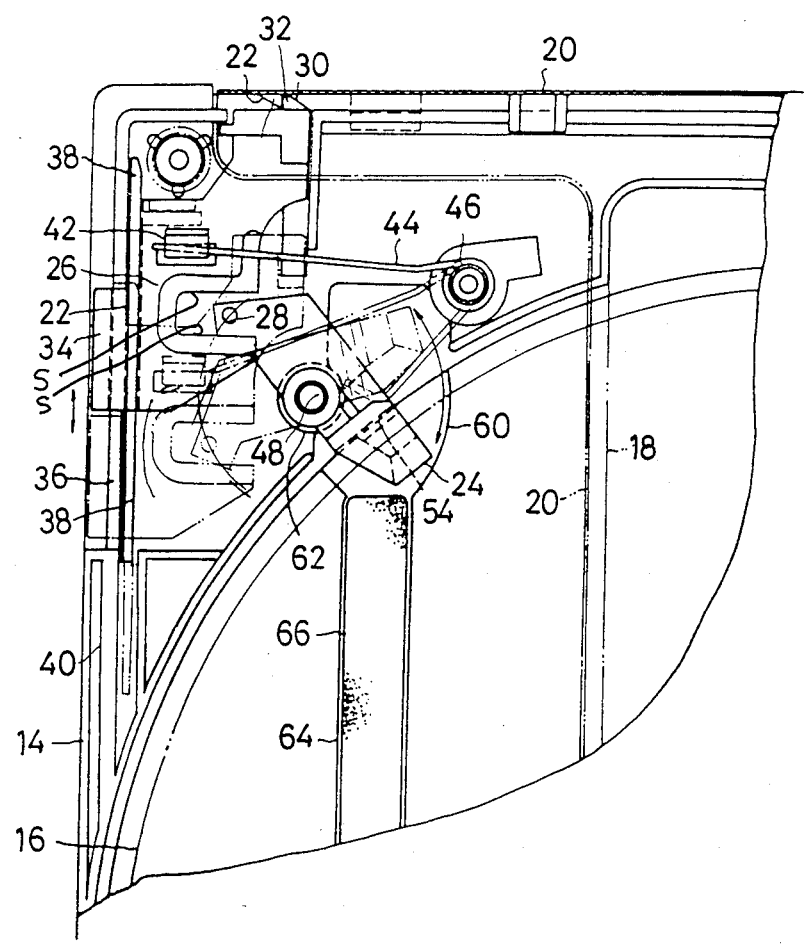

DISC CARTRIDGE

BACKGROUND OF THE INVENTION

The present invention relates to a disc cartridge, and more particularly to a disc cartridge which has a hard disc, especially a double-sided type hard disc, housed in a casing.

In general, a disc-type data recording carrier such as a compact disc (CD), a video disc (LD) or the like is used in a manner of being removed from a packing case and set in recording and/or reproducing equipment such as a disc player.

Conventionally, it has been highly desirable to protect such a disc-type recording carrier from the environment, because it is not only easily covered with dust and damaged, but adversely affected due to variation in temperature. For this purpose, a disc cartridge has been proposed which is adapted to house or receive a disc in an envelope such as a tray, a casing or the like, to accomplish protection of the disc. Such an envelope is so constructed that a shutter for actuating a window through which a head of a disc player is inserted therethrough into the envelope, is opened when a disc is to be operated and closed when it is not used.

However, when any unexpected shock is applied to the envelope due to, for example, dropping during non-use of the disc cartridge, then the shutter is often suddenly opened, resulting in the functioning of the envelope being deteriorated to a degree sufficient to cause it to become unserviceable. More particularly, the conventional disc cartridge is constructed in a manner such that a shutter lock member for locking the shutter during non-use is actuated in association with a disc actuator. Accordingly, when the disc cartridge is unexpected shocked during non-use, due to dropping or the like, the weight of the disc overcomes a bearing capacity of the disc actuator to actuate the disc actuator, which then actuates the shutter lock member to cause the shutter to become released from the shutter lock member, so that the window is opened, causing dust and the like to readily enter into the disc cartridge therethrough. Unfortunately, the conventional disc cartridge lacks an effective manner of eliminating such a problem except by manual closing of the shutter. However, the manual closing renders handling of the disc cartridge highly troublesome and deteriorates reliability of the disc cartridge.

Accordingly, it would be highly desirable to develop a disc cartridge which is capable of positively preventing a shutter from being opened due to any unexpected shock applied to the disc cartridge during non-use to thereby ensure operation of the disc cartridge with high reliability for a long period of time.

SUMMARY OF THE INVENTION

Accordingly, it is the object of the present invention to provide a disc cartridge which is capable of ensuring operation with high reliability for a long period of time.

It is another object of the present invention to provide a disc cartridge which is capable of effectively preventing dust or the like from entering into the disc cartridge.

It is a further object of the present invention to provide a disc cartridge which is capable of ensuring safe operation of a disc without adversely affecting a recording surface section of the disc.

It is still another object of the present invention to provide a disc cartridge which is capable of positively preventing a shutter from being suddenly actuated to open a window due to any unexpected shock applied to the disc cartridge during non-use of the disc cartridge.

It is yet another object of the present invention to provide a disc cartridge which is capable of safely of supporting a disc in a casing through a non-recording surface section of a disc without applying excessive or non-uniform force thereto.

It is still a further object of the present invention to provide a disc cartridge which is capable of accomplishing the above-noted objects with simple structure.

Other objects and advantages of the present invention will become apparent from the following description below.

These and other objects are attained by the present invention which is directed to a disc cartridge including a casing comprising a upper cover plate and a lower cover plate joined together to define a space therewithin, in which a disc is rotatably housed. The disc cartridge also includes a shutter for operating at least a window formed in the casing for insertion of a disc driving element of a disc player such as a disc head therethrough and into the casing, and a pair of actuators arranged within the casing. At least one of the actuators acts as a shutter lock element for releasably locking the shutter.

Furthermore, the disc cartridge includes a disc receiver operatively connected to each of the actuators in the casing and selectively receiving a part of a peripheral portion of the disc for retaining the disc at a substantially central position within the casing in a thickness direction of the casing, or in a "floating" state within the casing. The operative connection or engagement between each of the actuators and the corresponding disc cartridge is carried out by way of connection means which comprise a guide groove provided in one of the respective actuator and corresponding disc receiver, and a guide pin provided on the other of the respective actuator and corresponding disc receiver and movably fitted within the guide groove. The guide pin is arranged in the guide groove in a manner where it is kept apart from at least one surface of the guide groove opposite the guide pin in actuating directions of the actuator. Furthermore, the disc cartridge includes elastic means for causing the guide pin to be constantly positioned within the guide groove and forcing the disc receiver to return to its original position for keeping the guide pin apart from the opposite surface of the guide groove.

BRIEF DESCRIPTION OF THE DRAWINGS

For a fuller understanding of the present invention, reference is made to the following description taken in conjunction with the accompanying drawings in which like reference numerals designate like or corresponding parts throughout, wherein

FIG. 2 is a vertical sectional view along line II—II of FIG.

FIG. 3 is a fragmentary enlarged plan view illustrating an actuating section of the disc cartridge shown in FIG. 1;

DESCRIPTION OF THE PREFERRED EMBODIMENTS

A disc cartridge according to the present invention will now be described below with reference to the accompanying drawings.

Figure 1:
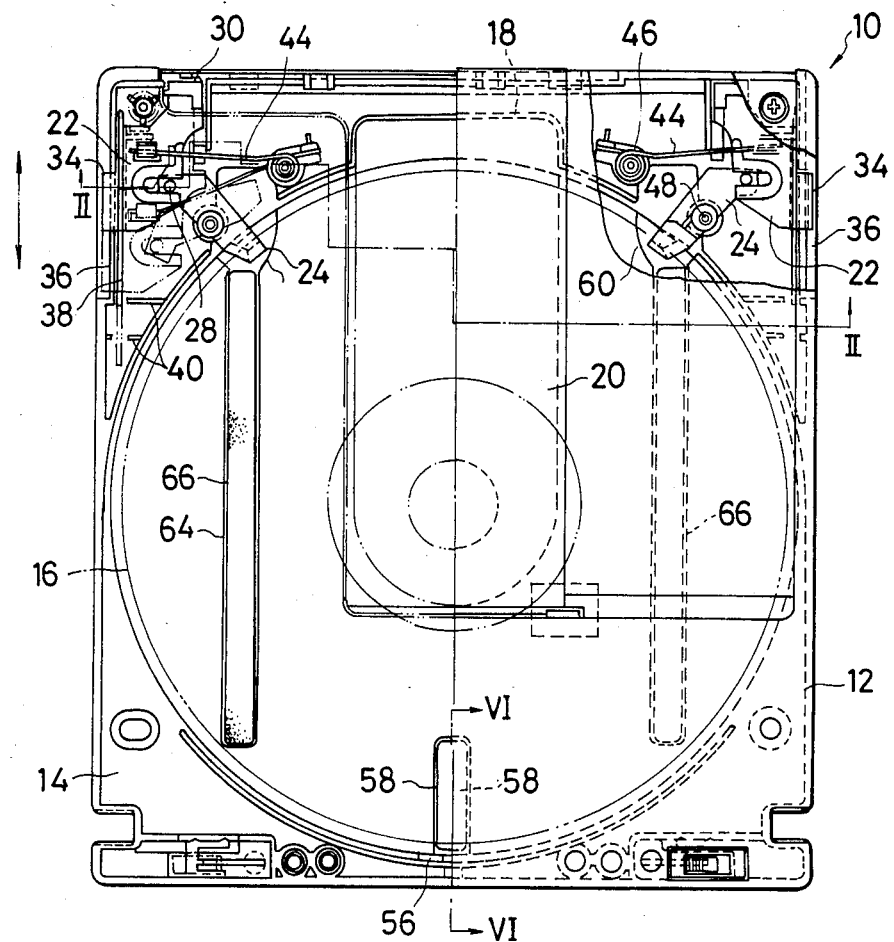
FIG. 1 is a plan view partially cut away illustrating an embodiment of a disc cartridge according to the present invention.

FIG. 1 generally illustrates an embodiment of a disc cartridge according to the present invention.

A disc cartridge as illustrated in FIGS. 1-3 includes a casing 10 comprising an upper cover plate 12 and a lower cover plate 14 joined together so as to define a space within the casing 10, and a disc 16 rotatably received or housed in the casing 10. The casing 10 is formed with an opening 18 at least in one of the upper and lower cover plates 12 and 14, in turn defining a window for inserting a disc driving element of a disc player (not illustrated) such as a disc head therethrough and into the casing 10. The window 18 is operated by a shutter 20.

The disc cartridge also includes a pair of actuators 22 arranged in the casing 10. At least one of the actuators 22 also acts as a shutter lock element for releasably locking the shutter 20. In the illustrated embodiment, the actuator 22 arranged on a left side of FIG. 1 serves as the shutter lock mechanism. Also, a pair of disc receivers 24 are arranged in the casing 10 and are operatively connected to or engaged with the respective actuators 22. Thus, it is noted that each of the actuators serve to actuate the corresponding disc receiver 24.

Figure 4:
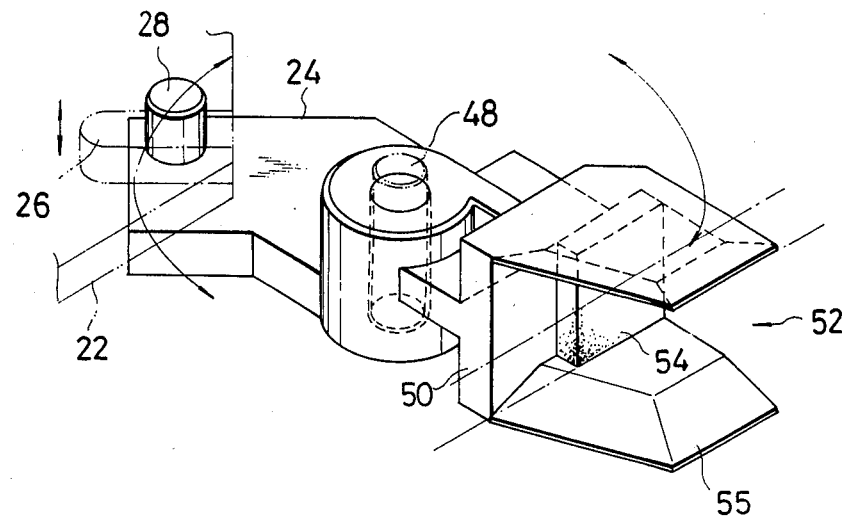
FIG. 4 is a perspective view illustrating a disc receiver.

The disc receivers 24 are each adapted to selectively receive therein a part of a peripheral portion of the disc 16, or a part of a peripheral end and upper and lower surfaces of the disc 16, and lift the disc. The actuator 22 is arranged in a manner to be slidable in the longitudinal direction of the cartridge as indicated by the arrows in FIGS. 1 and 3, while the disc receiver 24 is adapted to be approachably moved with respect to the disc 16 when the actuator 22 is slidably moved. Thus when the shutter 20 is actuated to close the window 18, the disc receiver 24 may be engaged with the disc 16 or a part of the disc 16 is inserted therewithin to force the disc 16 towards a rear end of the casing 10 while holding the disc 16 at a substantially central position of the casing 10 in a thickness direction of the casing 10. Thus, the disc 16 is thereby maintained in a state of "floating" within the space defined within the casing 10. When the shutter 20 is actuated to open the window 18, then the disc receiver 24 may be disengaged from the disc 16 to prepare the disc 16 for engagement with the disc driving element of the disc player which is then inserted through the opened window 18 into the cartridge.

in the illustrated embodiment, operative connection or engagement between each of the actuators 22 and the corresponding disc receiver 24 is carried out by connection means comprising a guide groove 26 formed in an inner side of the actuator 22 as shown in FIGS. 1 and 3, and a guide pin 28 provided at one end of the disc receiver 24 as shown in FIG. 4 and movably fitted or received in the guide groove 26. It is a matter of course within the context of the present invention, that the guide groove 26 and guide pin 28 may alternatively be provided in the disc receiver 24 and on the actuator 22 respectively. The guide groove 26 is formed into a substantially sideways U-shape with the guide pin 28 arranged within the guide groove so as to be kept apart from two surfaces S of the guide groove opposite to the guide pin 28 in actuating directions of the actuator indicated by the arrows in FIG. 1 at an interspace or interval D. The guide pin 28 is forced so as to be constantly positioned within the guide groove 26 by way of elastic means as described below.

The shutter 20 comprises a plate member of a substantially U-shape which is movably fitted on the casing 10 so as to be slidable along the upper and lower cover plates 12 and 14 in a lateral direction of the casing.

A pair of the actuators 22 as illustrated in FIG. 1 are formed to be substantially symmetric and arranged adjacent to both sides of a front portion of the casing 10, in a manner to be not only opposite to one another, but also substantially symmetric along a longitudinal axis of the cartridge and slidable with respect to the casing 10. Also, the actuators 22 each serve as an actuating lever for actuating operation sections of the disc cartridge. More particularly, the left one of the actuators 22 as shown in FIGS. 1 and 3 is provided at a front end thereof with lock means 30 which comprise, in the illustrated embodiment, a hook-like member integrally formed at a front end of the actuator 22 and securely engaged with the shutter 20 for locking the shutter 20. In the illustrated embodiment, the shutter 20 is engaged with the lock means 30 of the actuator 22 through a tongue-like projection 32 (FIG. 3) provided on the shutter 20.

Each of the actuators 22 is also provided on one side or an outer side thereof with actuating means 34 which comprise, in the illustrated embodiment, a projection integrally formed on the outer side of the actuator 22 and outwardly extending through a horizontally extending cutout or slot 36 formed in a side wall of the casing 10. Also, the actuator 22 has cover means 38 integrally mounted on one side or an inner side thereof so as to extend in a longitudinal direction thereof. The cover means 38 is formed to thoroughly cover the slot 36 formed in the side wall of the casing 10 in a sealed manner, to function as a protective dust cover for preventing any dust from entering the casing 10 through the slot 36. The above-described guide groove 26 is formed in a substantially sideways U-shape at the other side or an inner side of the actuator 22, as described above.

A pair of the so-constructed actuators 22 may be each arranged between the side wall of the casing 10 and an inwardly projecting guide rib 40 formed on an inner surface of each of the cover plates 12 and 14 in a manner to be slidable within the casing in the directions indicated by the arrows in FIGS. 1 and 3. The guide ribs 40 are provided opposite to one another. Alternatively, each of the actuators 22 may be slidably fitted in recesses or the like formed in the inner surface of the casing 10.

The actuator 22 is provided on an upper surface thereof with a spring bearing 42 as illustrated in FIG. 3 which is engaged with one end of a substantially V-shape spring 44 held at a base portion thereof on a spring holder 46 fixed on the casing 10, so that the actuator 22 may be constantly forced towards the front end of the casing 10. The other end of the substantially V-shaped spring 44 is engaged with the disc receiver 24, resulting in the guide pin 28 being forced so as to be constantly positioned within the guide groove 26, and the disc receiver 24 being forced to return to its original position to thereby keep the guide pin 28 spaced from the opposite surfaces of the guide groove 26. Such construction allows actuation of the actuator 22 by insertion or removal of the disc cartridge in or from a disc player, to be transmitted to the disc receiver 24 through engagement or abutment between the guide groove 26 and the guide pin 28 irrespective of the interspace or interval D, while at the same time effectively preventing any movement of the disc receiver 24 due to any shock applied to the disc cartridge during non-use from being transmitted to the actuator 22, because of the interspace or interval D to actuate the actuator 22.

A pair of the disc receivers 24 as shown in FIG. 1 are also formed in a substantially symmetrical manner. Each of the disc receivers 24 is generally formed into a lever-like shape as illustrated in FIGS. 1, 3 and 4 and movably fitted at a middle portion thereof on a pivot pin 48 securely supported between the inner surfaces of the cover plates 12 and 14, to cause the disc receiver 24 to be pivotally moved about the pivot pin 48 as indicated by arrows in FIG. 4 and vertically moved along the pivot pin 48.

Figure 5:
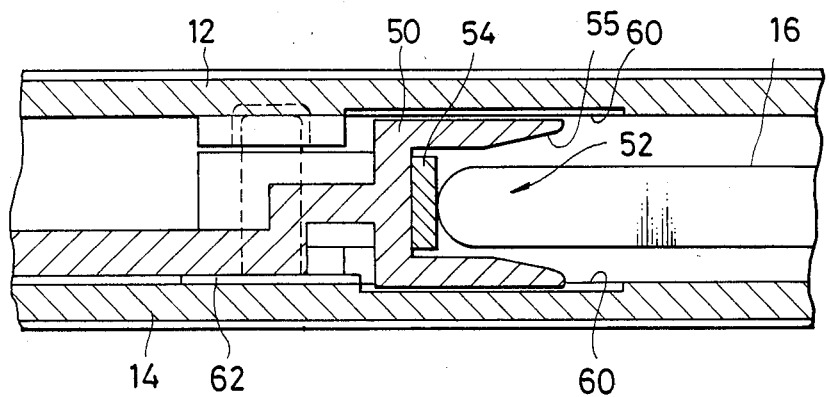
FIG. 5 is a fragmentary vertical sectional view illustrating a receiver body of a disc receiver.

The above-described substantially V-shaped spring 44 in the illustrated embodiment, is engaged with a middle portion of the disc receiver 24. The disc receiver 24 as illustrated in FIGS. 4 and 5, is provided at the other end thereof (opposite the end with the guide pin 28) with a receiver body 50 which is formed into a substantially sideways U-shape to define therein a recess designated by reference numeral 52. The recess 52 is provided with an elastic member 54 on an end surface thereof contacting the peripheral end portion of the disc 16, to prevent unsteadiness and/or damage of the disc in the disc receiver 24. Such an elastic member 54 may be arranged on upper and lower surfaces of the recess 52. The elastic member 54 may be formed of rubber or a soft plastic material such as polyethylene, polypropylene, vinyl chloride, or the like.

The recess 52 of the receiver body 50 is preferably formed in a manner such that its open end portion or inlet portion 55 is vertically enlarged so as to facilitate the insertion and removal of the disc 16 with respect to the recess 52. For example, the inlet portion 55 may have slanting or round surfaces.

The so-formed receiver bodies 50 are each positioned adjacent to the peripheral portion of the disc 16 to selectively receive a part of the peripheral portion in the recess 52 depending upon the sliding movement of the actuator 22, and also to act as an elevator for lifting the disc 16. The above-described guide pin 28 is provided at the opposite end of the disc receiver 24 as illustrated. In the illustrated embodiment, the guide pin 28 as described above, is spaced at the interval D from the surfaces S opposite to the guide pin 28 of the guide groove 26 in a substantially sideways U-shape, in the sliding or actuating directions of the actuator 22, as illustrated in FIG. 3. Such construction, even when the disc receiver 24 is suddenly actuated due to any unexpected shock applied to the disc cartridge due to dropping or the like during non-use of the disc cartridge, effectively prevents the disc receiver 24 from abutting against the actuator 22 because of the interval D to prevent actuation of the disc receiver 24 from being transmitted to the actuator 22.

In the illustrated embodiment, the spring 44 comprises a substantially V-shaped spring. However, it may comprise a coiled spring stretchingly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the spring 44 to not only constantly force the actuator 22 towards the front end of the casing 10, but also to constantly position the guide pin 28 in the guide groove 26 and force the disc receiver 24 to return to its original position to space the guide pin 28 from the opposite surfaces S of the guide groove 26 when the guide pin 28 is moved in the guide groove 26, during non-use of the disc cartridge.

Figure 6:
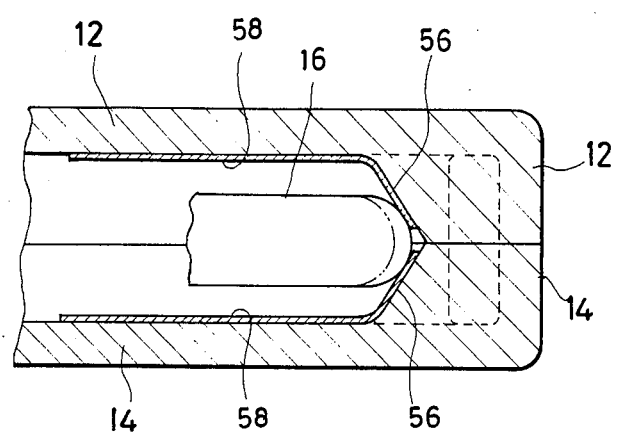
FIG. 6 is a vertical sectional view taken along line VI—VI of FIG. 1.

Furthermore, in the illustrated embodiment, at least a part of a peripheral end of the inner surface of the casing 10, especially a rear end surface 56 thereof as shown in FIG. 6, may be formed into a substantially sideways V-shape so that the rear end surface 56 may be tapered. Such construction facilitates positioning of the disc 16 at the center of the casing 10 in a thickness direction of the casing, because it is guided along the tapered inner end surface 56. This results in the disc 16 being located at positions indicated by the two dash-dot lines and solid lines in FIG. 6 when the disc cartridge is respectively charged into the disc player and removed therefrom. A disc holding member 58 of a sheet-like shape may be applied onto the rear end surface 56 to ensure safety and smooth operation of the disc 16 in the casing 10. For this purpose, the disc holding member 58 is preferably formed of a material which is capable of exhibiting lubricating properties, such as ultra-high-molecular-weight polyethylene, ultra-high-molecular-weight polyethylene foam, polyethylene terephthalate (PET) and the like. Such a member may likewise be applied to portions of the inner surface of the casing 10 adjacent to the tapered rear end surface 56 as shown in FIG. 6.

The casing 10 as shown in FIG. 1 is formed with a pair of recesses 60 on each of upper and lower portions of the inner surface thereof so as to positionally correspond to the disc receivers 24. The recess 60 serves to ensure smooth pivotal movement of the disc receiver 24 in the casing 10. Reference numeral 62 designates a base for supporting the disc receiver 24 thereon.

Reference numerals 64 and 66 designate recesses formed in the inner surface of the casing 10 and lubricating self-adhesive sheets received in the respective recesses 64. Each of the sheets 66 is preferably positioned so as to abut against a non-recording surface section of the disc 16 such as a peripheral section thereof, a central section thereof or the like, and arranged in a manner to somewhat project from the inner surface of the casing. In the illustrated embodiment, each of the cover plates 12 and 14 is provided with two such disc holding sheets 66 so as to positionally correspond to a substantially peripheral section of the disc 16 and in a substantially symmetrical manner, so that the disc 16 may be uniformly supported thereon.

The manner of operation of the disc cartridge of the illustrated embodiment constructed as described above will now be described below with reference to FIGS. 1-6.

When the disc cartridge is inserted in a disc player (not illustrated) for operation, the actuating means or projection 34 of the actuator 22 projecting through the slot 36 of each of the side walls of the casing 10, is engaged with a projection provided in an insertion port of the disc player and rearwardly slided along the slot 36 against the substantially V-shaped spring 44. Such sliding of the projection 34 causes the tongue-like projection 32 of the shutter 20 to become disengaged from the lock means or hook-like member of the actuator 22, so that the shutter 20 may be moved in a direction of opening the window 18 or in a rightward direction in FIG. 1, by the shutter actuating mechanism (not illustrated) of the disc Player. Concurrently, the disc receiver 24 is pivotally moved about the pivot pin 48 through engagement between the guide groove 26 and the guide pin 28 due to sliding of the actuator 22 from a position indicated by solid lines in FIG. 3, to a position indicated by phantom lines in that figure, releasing the disc 16 from the recess 52 of the receiver body 50 and resulting in the disc 16 being safely supported on the lubricating, self-adhesive sheets 66 provided on the inner surface of the casing 10 and then being operatively engaged with a disc driving element (not illustrated) of the disc player.

Then, when the disc cartridge is to be removed from the disc player, the disc 16 is first disengaged from the disc driving element of the disc player in the casing 10, to be put on the lubricating, self-adhesive sheets 66. Then the shutter 20 is moved by means of The shutter actuating mechanism of the disc player, to close the window 18. The disc cartridge is then removed from the disc player, so that the actuator 22 may be slided towards the front end of the disc cartridge by means of the substantially V-shaped spring 44 to actuate the disc receiver 24 to thereby fit or receive a part of the peripheral portion of the disc 16 within the receiver body 50. This results in the disc 16 being forced towards the rear end 56 of the casing 10 while being maintained in a state of "floating" within the space defined within the casing. Simultaneously, the lock means 30 of the actuator 22 is engaged with the tongue-like projection of the shutter 20 to keep the shutter 20 closed.

During non-use of the disc cartridge, the guide pin 28 of the disc receiver 24 is constantly positioned in the guide groove 26 while being spaced from the opposite surfaces S of the guide groove 26 at the interspace or interval D, by means of the substantially V-shaped spring 44. The disc receiver 24 keeps the disc 16 in the central position within the casing 10 in the thickness direction of the casing 10. Thus, even when any unexpected shock is suddenly applied to the disc cartridge, the guide pin 28 of the disc receiver 24 which holds the disc 16 fails to engage with the guide groove 26, due to the interval or interspace D, although the guide pin 28 is freely movable within the guide groove 26 since the guide pin 28 is spaced from the surfaces S of the guide groove 26 in the actuating directions of the actuator 22. Then, the guide pin 28 is immediately returned to the original position by means of the spring 44, so that any load will not be applied to the actuator 22. Thus, the shutter 20 is effectively prevented from being suddenly actuated due to the shock, during non-use of the disc cartridge.

Thus, it is noted that the disc cartridge constantly and effectively prevents dust or the like from entering into the casing 10. Also, the disc cartridge constantly retains the disc 16 in a safe state within the casing 10, because a recording surface section of the disc 16 is prevented from being contacted directly by the inner surface of the casing 10.

Figure 7:
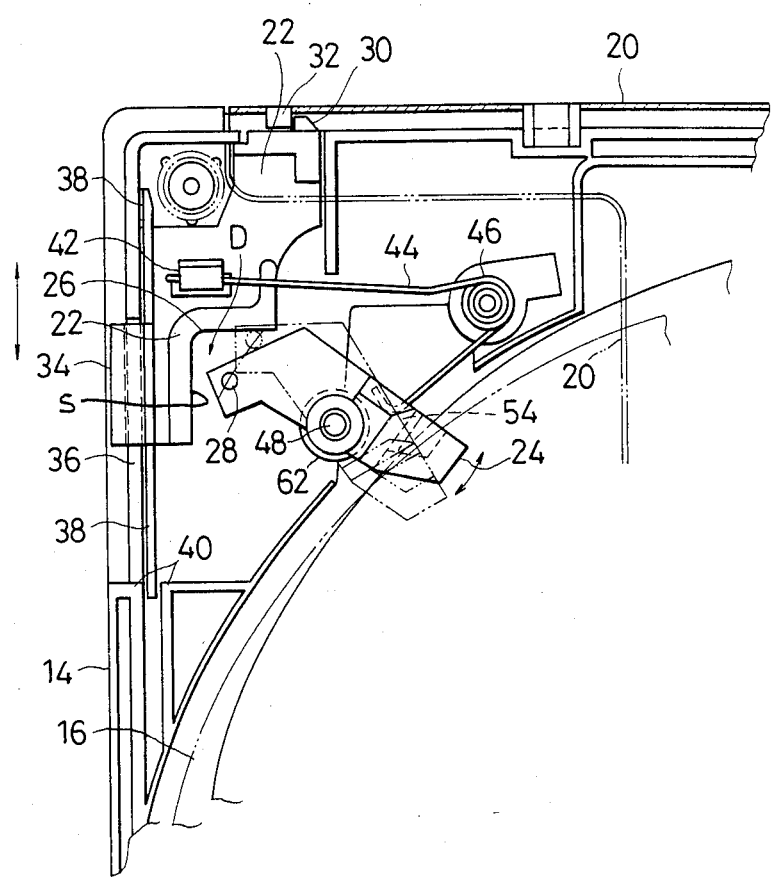
FIG. 7 is a fragmentary enlarged plan view illustrating an important part of another embodiment of a disc cartridge according to the present invention.

FIG. 7 illustrates another embodiment of a disc cartridge according to the present invention. In the embodiment illustrated in FIG. 7, a guide groove 26 of each of the actuators 22 is formed into a substantially inverted L-shape, so that the guide groove 26 has only one surface S opposite to a guide pin 28 in actuating directions of the actuator 22. Also, a substantially V-shaped spring 44 is arranged to keep the guide pin 28 apart from the opposite surface S of the guide groove 26, at an interval D during non-use of the disc cartridge. This results in the disc receiver 24 being retained in a position indicated by solid lines in FIG. 7 during non-use of the disc cartridge. Even when any unexpected shock is suddenly applied to the disc cartridge to actuate the disc receiver 24 during the non-use, the disc receiver 24 is moved to a position indicated by the phantom lines in FIG. 7 to prevent the guide pin 28 from abutting against the surface S of the guide groove, because of the interval D, so that the actuator 22 may be kept stationary. The remaining components of the embodiment shown in FIG. 7 may be constructed in substantially the same manner as described above with respect to FIGS. 1-6.

As can be seen from the foregoing, in the disc cartridge of the present invention, each of the actuators is operatively connected to the corresponding disc receiver through the connecting means comprising the guide groove and guide pin which are engaged with one another when the disc cartridge is inserted into or removed from a disc player. Also, the elastic means or spring cause the guide pin to be constantly positioned in the guide groove while keeping the guide pin apart from the opposite surface or surfaces of the guide groove and constantly forcing the disc receiver to return to its original position.

Such construction of the disc cartridge, even when any unexpected shock is suddenly applied to the cartridge to actuate the disc receiver during non-use of the disc cartridge, effectively prevents the actuator from being actuated due to movement of the disc receiver, resulting in the shutter being kept closed. Accordingly, it is noted that the disc cartridge of the present invention positively prevents any foreign matter such as dust or the like from entering into the casing, so that satisfactory operation of the disc cartridge may be ensured for a long period of time. Also, the present invention allows the disc receiver to securely and safely hold the disc without applying non-uniform force to the disc during the non-use, while keeping the disc in a floating state within the casing so that disc may be safely housed in the casing.

It is thus seen that the objects set forth above, and those made apparent from the preceding description, are efficiently obtained, while certain changes may be made in the above construction without departing from the spirit and scope of the invention. It is intended that all description contained above and shown in the accompanying drawings is intended to be merely illustrative, and not in a limiting sense. For example, the present invention may operate with a different number of actuators 22 and a different number of disc receivers 24.

What is claimed is:

1. A disc cartridge, comprising:
 a casing comprising an upper cover plate and a lower cover plate joined together to define a space in said casing;
 a disc rotatably housed in said casing;
 a shutter for operating at least one window provided in said casing for insertion of a disc driving element of a disc player therethrough into said casing;

a pair of actuators arranged in said casing;
at least one of said actuators including a shutter lock element for releasably locking said shutter;
a pair of disc receivers arranged in said casing, each disc receiver operatively connected to a respective one of said actuators and selectively receiving a part of a peripheral portion of said disc to retain said disc at a substantially central position in said casing in a thickness direction of said casing;
connection means for operatively connecting each of said actuators to said corresponding disc receiver;
said connection means comprising a guide groove provided in one of said actuator and corresponding disc receiver, and a guide pin provided on the other of said actuator and corresponding disc receiver and selectively engaged with said guide groove, said guide pin being arranged in said guide groove in a manner to be spaced from at least one surface of said actuator or corresponding disc receiver defining said guide groove and
elastic means for continuously positioning said guide pin in said guide groove and forcing said disc receiver to return to an original position thereof maintaining said guide pin apart from said at least one surface of said guide groove;
wherein said elastic means comprise a spring mounted at a base portion thereof on said casing, and having one end engaged with said actuator and the other end engaged with said disc receiver.

2. The disc cartridge of claim 1, wherein said guide groove is provided in said actuator and said guide pin is provided on said disc receiver.

3. The disc cartridge of claim 2, wherein said guide pin is provided at one end of said disc receiver, and said disc receiver comprises a pivot pin about which said disc receiver is pivotally mounted and moved by actuation of said actuator through said connecting means.

4. The disc cartridge of claim 3, wherein said disc receiver is provided at the other end thereof with a receiver body which is approachably movable with respect to said peripheral portion of said disc to selectively receive said disc therein when said disc receiver is pivotally moved about said pivot pin by said guide pin and by actuation of said actuator.

5. The disc cartridge of claim 1, wherein said shutter lock element is provided with lock means for locking said shutter when said shutter is actuated to close said window.

6. The disc cartridge of claim 1, wherein said actuator comprises an actuating member outwardly projecting from said casing, said actuator being actuated through said actuating member.

7. The disc cartridge of claim 2, wherein said guide groove is formed in a substantial U-shape.

8. The disc cartridge of claim 2, wherein said surface defining said guide groove is formed into a substantial L-shape 9. The disc cartridge of claim 1, wherein said spring is substantially V-shaped 10. The disc cartridge of claim 1, wherein said actuator is movably arranged between a side wall of said casing and guide ribs provided on upper and lower inner surface sections of an inner surface of said casing, so as to inwardly project therefrom opposite to one another.

11. A disc cartridge, comprising;
a casing comprising an upper cover plate and a lower cover plate joined together to define a space in said casing;
a disc rotatably housed in said casing;
a shutter for operating at lest one window provided in said casing for insertion of a disc driving element of a disc player therethrough into said casing;
a pair of actuators arranged in said casing;
a shutter lock element coupled to one of said actuators and provided with lock means for releasably locking said shutter when said shutter is actuated to close said window;
a pair of disc receivers arranged in said casing, each said disc receiver operatively connected to a respective one of said actuators and selectively receiving a part of a peripheral portion of said disc to hold said disc at a substantially central position of said space in a thickness direction of said casing;
connection means for operatively connecting each of said actuators to the corresponding disc receiver;
said connection means comprising a guide groove provided in said actuator and a guide pin provided on said disc receiver and movably arranged within said guide groove, said guide groove being formed into a substantial U-shape so as to have two surfaces opposite one another, said guide pin being abuttingly engaged with said guide groove for actuating said disc receiver when said disc cartridge is inserted in the disc player, and said guide pin being spaced from said opposite surfaces of said guide groove during non-use of said disc cartridge; and
elastic means for constantly positioning said guide pin in said guide groove and forcing said disc receiver to return to an original position for maintaining said guide pin apart from said opposite surfaces of said guide groove;
wherein said elastic means comprise a spring mounted at a base portion thereof on said casing, and having one end engaged with said actuator and the other end engaged with said disc receiver.

12. The cartridge of claim 11, wherein said spring is substantially V-shaped.

13. A disc cartridge, comprising:
a casing comprising an upper cover plate and a lower cover plate joined together to define a space within said casing;
a disc rotatably housed in said casing;
a shutter for operating at least one window provided in said casing for insertion of a disc driving element of a disc player therethrough into said casing;
a pair of actuators arranged in said casing;
a shutterlock element coupled to one of said actuators and provided with lock means for releasably locking said shutter when said shutter is actuated to close said window;
a pair of disc receivers arranged in said casing, each disc receiver operatively connected to a respective one of said pair of actuators and selectively receiving a part of a peripheral portion of said disc to hold said disc at a substantially central position of said space in a thickness direction of said casing;
connection means for operatively connecting each of said actuators to the corresponding disc receiver;
said connection means comprising a guide groove provided in said actuator and a guide pin provided on said disc receiver and movably arranged in said guide groove, said guide groove being defined by a surface formed into a substantial L-shape having two legs, said guide pin being abuttingly engaged with said guide groove for actuating said disc receiver when said disc cartridge is inserted in the disc player and said guide pin being spaced from at least one leg of the surface of said guide groove during non-use of said disc cartridge; and elastic means for constantly positioning said guide pin in said guide groove and forcing said receiver to return to an original position for maintaining said guide pin apart from said at least one surface leg of said guide groove;

wherein said elastic means comprise a spring mounted at a base portion thereof on said casing, and having one end engaged with said actuator and the other end engaged with said disc receiver.

14. The cartridge of claim 13, wherein said spring is substantially v-shaped.

* * * * *